US009193405B2

(12) United States Patent
Pohl et al.

(10) Patent No.: US 9,193,405 B2
(45) Date of Patent: Nov. 24, 2015

(54) REINFORCING STRUCTURE FOR REINFORCING A SIDE WALL STRUCTURE FOR A MOTOR VEHICLE IN THE REGION OF A DOOR CUTOUT

(71) Applicant: GM GLOBAL TECHNOLOGY OPERATIONS LLC, Detroit, MI (US)

(72) Inventors: Bernd Pohl, Muenster-Sarmsheim (DE); Stefan Stanik, Bruchkoebel (DE)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 13/622,531

(22) Filed: Sep. 19, 2012

(65) Prior Publication Data

US 2013/0076075 A1 Mar. 28, 2013

(30) Foreign Application Priority Data

Sep. 20, 2011 (DE) .......................... 10 2011 113 675

(51) Int. Cl.
| | | |
|---|---|---|
| B62D 25/02 | (2006.01) | |
| B62D 65/06 | (2006.01) | |
| B23K 31/02 | (2006.01) | |
| B21D 31/00 | (2006.01) | |
| B62D 25/04 | (2006.01) | |

(52) U.S. Cl.
CPC ................ *B62D 65/06* (2013.01); *B21D 31/00* (2013.01); *B23K 31/02* (2013.01); *B62D 25/02* (2013.01); *B62D 25/025* (2013.01); *B62D 25/04* (2013.01); *Y10T 29/49616* (2015.01)

(58) Field of Classification Search
CPC ......... B62D 25/04; B62D 25/02; B62D 65/06
USPC ..................... 296/203.3, 203.01, 202, 193.06
See application file for complete search history.

(56) References Cited

U.S. PATENT DOCUMENTS

| 5,785,378 | A | 7/1998 | Seefried et al. |
| 5,938,275 | A | 8/1999 | Kleinhans et al. |
| 6,050,323 | A | 4/2000 | Soell et al. |
| 7,677,645 | B2 * | 3/2010 | Henkelmann ............ 296/187.12 |
| 8,382,197 | B2 * | 2/2013 | Eberlein .................. 296/193.06 |
| 8,491,046 | B2 * | 7/2013 | Nagai et al. .............. 296/193.05 |

(Continued)

FOREIGN PATENT DOCUMENTS

| DE | 19724427 A1 | 12/1998 |
| DE | 102007037510 A1 | 2/2009 |
| DE | 102007038087 A1 | 2/2009 |

(Continued)

OTHER PUBLICATIONS

German Patent Office, German Search Report for Application No. 102011113975.8, dated Apr. 13, 2012.

*Primary Examiner* — Dennis H Pedder
(74) *Attorney, Agent, or Firm* — Ingrassia Fisher & Lorenz PC

(57) ABSTRACT

The present disclosure relates to a reinforcing structure for reinforcing a side wall structure for a motor vehicle in the region of a door cutout, wherein the reinforcing structure is designed ring-shaped in order to surround a door cutout of a side wall structure. It is provided that the reinforcing structure is produced material-uniformly. The present disclosure furthermore relates to a semi-finished product for producing such a reinforcing structure and to a method for producing the reinforcing structure. The present disclosure also relates to a side wall structure and to a side wall for a motor vehicle.

8 Claims, 1 Drawing Sheet

(56) References Cited

U.S. PATENT DOCUMENTS

| | | |
|---|---|---|
| 2003/0102697 A1 | 6/2003 | Takashi et al. |
| 2005/0046238 A1 | 3/2005 | Miyoshi et al. |
| 2008/0211264 A1* | 9/2008 | Riess et al. ............... 296/193.01 |
| 2010/0259072 A1* | 10/2010 | Mizohata ................. 296/203.03 |

FOREIGN PATENT DOCUMENTS

| | | |
|---|---|---|
| DE | 102010009183 A1 | 8/2011 |
| DE | 102010019999 A1 | 11/2011 |
| FR | 2934231 A1 | 1/2010 |
| WO | 2009046808 A1 | 4/2009 |

\* cited by examiner

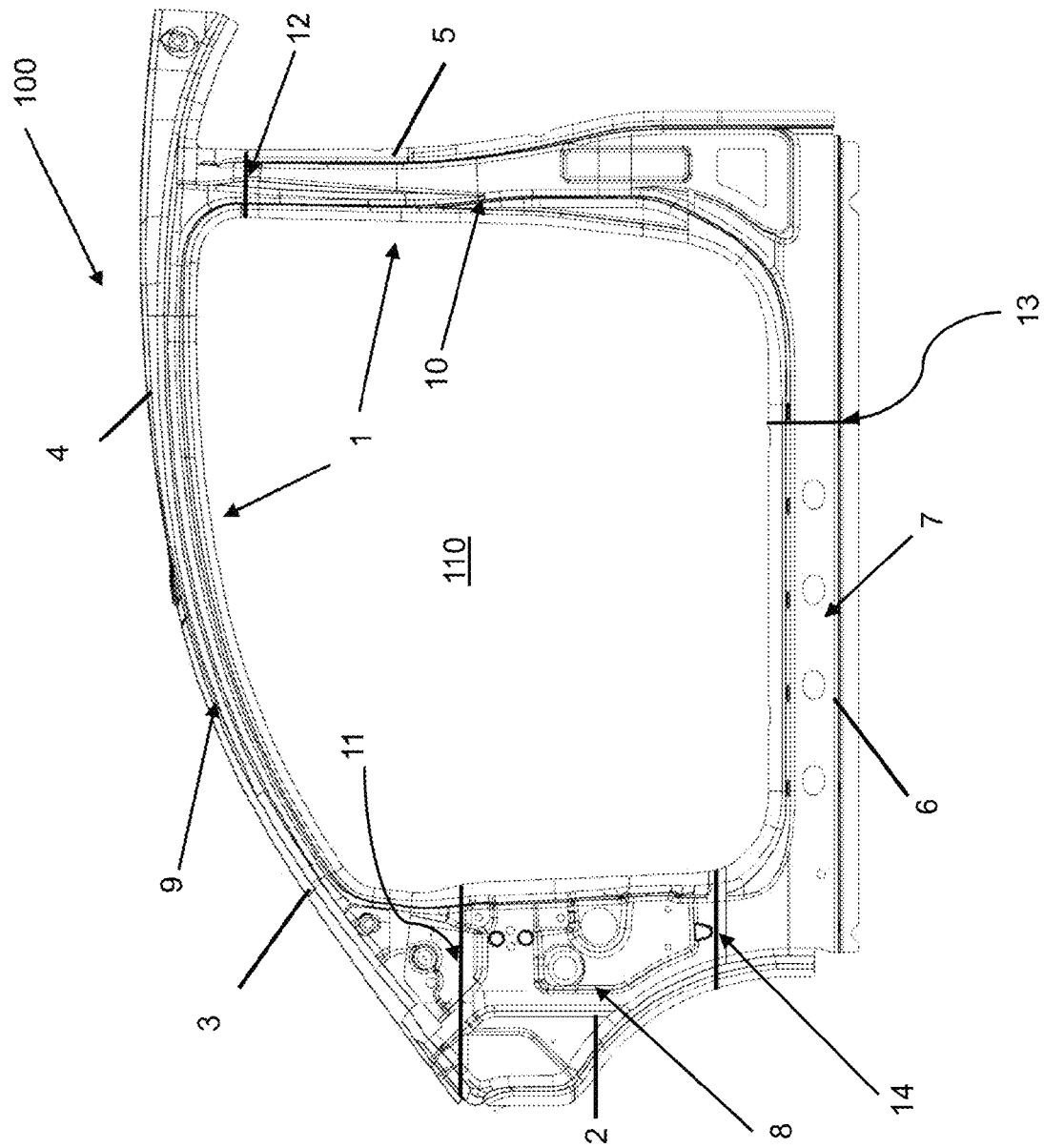

REINFORCING STRUCTURE FOR REINFORCING A SIDE WALL STRUCTURE FOR A MOTOR VEHICLE IN THE REGION OF A DOOR CUTOUT

CROSS-REFERENCE TO RELATED APPLICATION

This application claims priority to German Patent Application No. 10 2011 113 675.8, filed Sep. 20, 2011, which is incorporated herein by reference in its entirety.

TECHNICAL FIELD

The technical field relates to a reinforcing structure for reinforcing a side wall structure for a motor vehicle in the region of a door cutout. The technical field furthermore relates to a method and to a semi-finished product for producing a reinforcing structure. In addition, the technical field relates to a side wall structure having such a reinforcing structure and to a side wall for a motor vehicle.

BACKGROUND

Such reinforcing structures serve for the reinforcing of a side wall structure of a motor vehicle in the region of a door cutout. The reinforcing structures stiffen the side wall structure that is weakened through the relatively large door cutouts. Through the reinforcing structures, the side walls of a motor vehicle are stabilized so far that during a lateral crash of the motor vehicle, a deformation of the side wall is counteracted and thus a high level of occupant protection is achieved.

The reinforcing structures are usually designed ring-shaped and surround a door cutout of the side wall structure of the motor vehicle. The reinforcing structures to this end usually run along a portion of the lateral roof frame of the motor vehicle at their upper end and along the sill of the motor vehicle at their lower end. With their front end and their rear end, the reinforcing structures each usually extend along a pillar of the motor vehicle, such as for example the A-pillar and the B-pillar. Usually, the reinforcing structures are an integral part of the vehicle pillars and of the lateral roof frame and of the sill.

In order to be able to optimally reinforce the side wall structure in the region of the door cutout it is usual that the reinforcing structures develop a different reinforcing effect along their circumference. For example, the reinforcing structures in the region of the B-pillar and in the region of the lateral roof frame have a greater reinforcing effect than in the other connection regions to the side wall structure.

To this end, the reinforcing structures have been formed through a plurality of separate components up to now, which are especially designed for the reinforcing effect to be produced in the assembled state of the reinforcing structure on the side wall of the motor vehicle. Usually, the components are supplied by different suppliers and different plants and are joined on location by means of spot welding and the ring-shaped reinforcing structure formed in this manner.

Such a procedure during the production of the reinforcing structures is relatively elaborate and thus cost-intensive. In addition, other objects, desirable features and characteristics will become apparent from the subsequent summary and detailed description, and the appended claims, taken in conjunction with the accompanying drawings and this background.

SUMMARY

According to various aspects of the present disclosure, provided is a reinforcing structure having the features mentioned at the outset, which compared with the previous reinforcing structures can be produced with less effort and thus more cost-effectively. Furthermore, a corresponding method for producing such a reinforcing structure is to be stated. In addition, a side wall structure and a side wall for a motor vehicle are to be provided, which are suitable for use in such a reinforcing structure.

Further provided according to various exemplary embodiments is a reinforcing structure for reinforcing a side wall structure for a motor vehicle in the region of a door cutout. In one exemplary embodiment, the reinforcing structure for reinforcing a side wall structure for a motor vehicle is designed ring-shaped in order to surround a door cutout of a side wall structure of the motor vehicle. To this end, the reinforcing structure is generally configured in one piece or unitarily.

According to the various teachings of the present disclosure, the reinforcing structure comprises at least partially a press-hardened steel or a press-hardened steel alloy.

Through this measure, the reinforcing structure can be realized in a simple manner in production terms, since for forming the reinforcing structure, at least one press-hardened material is utilized, so that the aspired reinforcing effect of individual portions of the reinforcing structure can be specifically set or created during the course of the press hardening. Producing individual portions of the reinforcing structure by different suppliers in different plants for producing different types of reinforcing effects of the portions can be avoided because of this. The semi-finished product for the reinforcing structure can already be produced in its ring shape in a single plant at a single supplier. A substantial simplification during the production of the reinforcing structure is obtained even because of this.

The press-hardened steel or the press-hardened steel alloy is a high-strength steel or a high-strength steel alloy. Such steels or steel alloys are also called PHS-steel or PHS-steel alloy. These are characterized by a generally high strength. In addition, the reinforcing structure through its production from a PHS-steel or a PHS-steel alloy has a high degree of fitting precision.

During the course of the present disclosure, a PHS-steel is to mean a steel produced by means of the so-called PHS-technology, which is also called "press-hardening steel" or "press hardened steel".

For example, a plate of PHS-steel can be stretched through deep-drawing and processed relatively problem-free. During a subsequent hot forming, the plate becomes a dimensionally stable and extremely strong element.

In one example, the press-hardened steel alloy comprises a component of zinc as alloy component. Because of this, the formed reinforcing ring has a high corrosion resistance. Additionally or alternatively, aluminum, silicon, zinc-iron and/or zinc-nickel can be alloying components, wherein the aforementioned elements can also be added as alloy individually or with other elements.

The reinforcing ring can have press-hardened portions which comprise a different material.

It can also be provided that the reinforcing structure is produced material-uniformly. Because of this, a common or a single material is utilized for forming the reinforcing structure.

According to one exemplary configuration of the present disclosure it is provided that the reinforcing structure is a hot-formed and/or cold-formed component. Because of this, the reinforcing structure can be configured through a certain shaping in individual regions so that for the different reinforcing requirements in different regions of the reinforcing structure, suitably different designs can be selected in a simple manner because of this, which lead to the reinforcing or stiffening in the corresponding regions to a greater or lesser degree. Such a shaping can be carried out through hot forming or cold forming A combined procedure through cold forming and subsequent hot forming is also possible. The forming can be carried out for example through deep-drawing.

Insofar as the reinforcing structure is produced from PHS-steel, a reinforcing structure with particularly dimensionally stable and high-strength material strength properties is realized through the forming by means of a hot forming method, wherein through prior cold forming if required, a particularly good total forming can be achieved for example.

According to a one exemplary configuration of the present disclosure it is provided that the reinforcing structure comprises at least two, generally a plurality of portions of which at least one of the portions is distinct in its material thickness relative to at least one other one of the portions. Because of this, the reinforcing structure can be individually and flexibly adapted to the reinforcing effect demanded in the different regions of the door cutout, in that corresponding to a high reinforcing effect, a greater material thickness of the associated portion of the reinforcing structure relative to other portions of the reinforcing structure is also selected.

In one example, the reinforcing structure is formed of the at least two, and generally, a plurality of portions.

According to a further exemplary configuration of the present disclosure it is provided that at least one of the portions has a thickness profile that is not uniform. Because of this, a reinforcing effect that is targeted with regard to the respective portion can be achieved, which in at least one or a plurality of regions of the portion is distinct relative to at least one other region of the portion. Because of this, the respective portion can be adapted in a particularly flexible manner to predetermined reinforcing requirements on the side wall or side wall structure of the motor vehicle, in that a thickness profile suitable for this is formed for the respective portion.

The thickness portion can change for example in longitudinal direction of the portion and/or in transverse direction of the portion. The thickness profile can also be uniform for example in transverse direction of the portion and change in longitudinal direction of the portion. It is also possible that the thickness profile is uniform in longitudinal direction of the portion and changes in transverse direction of the portion.

Obviously, it can also be provided that at least one of the portions has a uniform thickness profile. All portions can also have a uniform thickness profile.

Generally, the portions are to be joined to one another through welding or such thermal joining method. Because of this, a particularly stable connection of the portions to one another is realized in a technically simple manner.

The present disclosure also comprises a semi-finished product for producing a reinforcing structure of the type described above, wherein the semi-finished product is formed of at least one, generally a plurality of blanks, for example, sheet metal blanks and forms a ring structure. The blanks comprise a material that is suitable for press hardening in order to be able to produce a reinforcing structure of the type described above from these blanks.

Generally, the material should be of a high-strength type or be suitable so that at least at the end of the shaping the high-strength properties for the reinforcing structure are created. Insofar, the material should be formed for forming a PHS-steel.

Furthermore, it can be that the blanks comprise a same material, so that the semi-finished product is then produced material-uniformly.

A semi-finished product of the type described above can be produced in a technically simple manner and thus cost-effectively, in that to this end merely the at least one blank or the plurality of blanks is necessary, which, even in an earlier phase of the manufacturing chain, are connected to one another subject to the forming of a ring structure or form a ring structure. Because of this, all further production steps up to producing the end product, namely the reinforcing structure according to the present disclosure, can already be carried out with a single component, so that an elaborate joining at the end of the production chain is avoided.

Through the semi-finished product it is made possible that a single component, namely the semi-finished product, is supplied into the plant of the automobile manufacturer where merely the single component is further processed. Because of this, stockholding costs can be substantially reduced, which were incurred for the previously supplied multiplicity of individual portions for forming the reinforcing ring.

In order to fulfill the different requirements with respect to the reinforcing effect over the circumference of the ring structure, at least one of the blanks should be distinct in its material thickness relative to at least one other one of the blanks. Generally, the blanks should each differ from one another in their material thickness, so that specifically through the selected material thickness of the respective blank, circumference portions of the ring structure are already adapted to the different reinforcing requirements of the reinforcing structure in the installed state.

During the course of the present disclosure, blank is to mean a sheet or plate, for example, metal sheet or metal plate, which in one example is unwound from a coil and has received a first cut to size. Coil during the course of the present disclosure is to mean that the material is still present as raw product, i.e. no cutting to size or other further processing has yet taken place. The material is wound onto a reel as strip or wire.

According to another exemplary configuration of the present disclosure it is provided that at least one of the blanks is configured in the manner of a tailored rolled blank. Such a tailored rolled blank is an already formed blank, which when delivered as coil, i.e. in the raw state, has already been subjected to a forming step through cold rolling, wherein the rollers have created different material thickness for example through moving up and down. By forming at least one blank as tailored roller blank, a blank can thus be realized, which comprises a non-uniform thickness profile or varies in its material thickness, wherein the transition between two material thicknesses is generally homogeneous, so that a crack formation in the region of the transition of two material thickness under load is largely avoided.

According to another exemplary configuration of the present disclosure it is provided that at least two of the blanks are interconnected in the manner of tailored welded blanks. Because of this, the at least two blanks are interconnected into a common blank by means of welding, so that because of this a further variability in the material thickness through the individual blanks is achieved, which with the tailored welded blank have already been joined into a common blank.

Because of this, a composite with a particularly high mechanical stability is formed, which, through the suitable selection of the blanks with their flexibly selectable material thicknesses and in each case selectable thickness profiles, which can be designed uniformly or non-uniformly, can be flexibly configured. By means of this, regions or portions of the semi-finished product can already be prepared in the manner that the reinforcing structure produced from it satisfies the different requirements with respect to the reinforcing effect in its regions and portions without there being any over-dimensioning. Insofar it is already ensured through the forming of such a semi-finished product that a reinforcing structure can be realized from this, which in terms of weight is very light while an optimal reinforcing effect is provided at the same time.

By forming at least one blank or a plurality of the blanks as tailored blanks, the advantage that blanks from different sheet metal thicknesses can be assembled and thus different locations of the reinforcing structure can be adapted to local loads is utilized, which would otherwise require additional reinforcing parts or a stronger dimensioning of the reinforcing structure. In addition to the weight saving, savings in the production costs are also obtained because of this.

Generally, the at least two of the blanks connected to one another in the manner of a tailored welded blank should be welded together, for example, butt-welded together. Because of this, no material portions need not be provided as welding flange on the blanks to be welded together. Because of this, a material saving and thus ultimately also a weight saving are obtained.

According to another exemplary embodiment of the present disclosure it is provided that the portions of the reinforcing structure can also be formed out of the blanks. Because of this, the portions of the reinforcing structure are specifically realized through the selection of the blanks, which have to satisfy the different requirements with respect to the reinforcing effect. For example, a blank can be used as a base for producing the portion which serves for connection to a vehicle pillar or the sill of the vehicle and/or the lateral roof frame of the vehicle.

Generally, the semi-finished product should be capable of being pot-formed and/or cold-formed so that after the production of the semi-finished product during the course of the further production method, the semi-finished product can be formed into the aspired reinforcing structure with at least one forming step and to this end, a cold forming and/or hot forming can be carried out.

Obviously, it can also be that the semi-finished product itself has already been partially hot-formed and/or cold-formed.

Furthermore, the present disclosure comprises a method for producing a reinforcing structure of the type described above:

Providing blanks which at least partially comprise a material that is suitable for press hardening.

Connecting the blanks to one another subject to forming a ring structure, so that a semi-finished product of the type described above is formed.

Creating the reinforcing structure through hot forming of the semi-finished product without its prior cold forming or through cold forming of the semi-finished product and subsequent hot forming of the cold-formed semi-finished product, so that from the blanks of the semi-finished product the portions of the reinforcing structure are produced.

Through such a method, a reinforcing structure of the type described above can be easily realized in production terms, since the shaping is carried out through the hot forming and/or cold forming on a single component, namely a semi-finished product of the type described above with blanks already joined together. Because of this, an elaborate forming of the individual blanks and an only subsequent joining of the formed parts into a reinforcing structure is avoided.

In addition, the changes in the material structure that develop during the welding upon the subsequent joining of the already formed parts are avoided, since with the semi-finished product made available according to the present disclosure the individual blanks are already joined prior to the at least one forming step. Any changes in the material structure that are present in the semi-finished product in the connection regions, for example, welding regions, are counteracted here through the following forming of the semi-finished product.

According to a further development of the method it is provided that the blanks are provided as tailored rolled blanks, for example, as tailored rolled blanks with non-uniform thickness profile.

According to a further exemplary embodiment of the present disclosure it is provided that the blanks are connected to one another through welding for producing a tailored rolled welded blank.

According to a further aspect, the present disclosure relates to a side wall structure for a motor vehicle, on which a reinforcing structure of the previously described type is formed, for example, molded. Because of this, the reinforcing structure is an integral part of the side wall structure and an embodiment of the reinforcing structure as separate components thus avoided. A further weight reduction is achieved, since a heavy separate component as reinforcing structure can be omitted.

The side wall structure can be an outer side wall structure for a motor vehicle.

Furthermore, the present disclosure relates to a side wall for a motor vehicle having a side wall structure of the type described above as outer side wall structure and an inner side wall structure.

The side wall can be substantially free of a separate reinforcing structure located between the outer side wall structure and the inner side wall structure.

It can also be obvious that a side wall structure of the type described above is arranged between an outer side wall structure and an inner side wall structure, so that the side wall through the reinforcing structure, the inner side wall structure and the outer side wall structure are formed as separate components.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 1 shows an exemplary embodiment of a reinforcing structure for reinforcing a side wall structure for a motor vehicle in the region of a door cutout in lateral view.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

FIG. 1 shows an exemplary embodiment of a reinforcing structure 1 for a motor vehicle. The reinforcing structure 1 serves for reinforcing a side wall structure of a motor vehicle in the region of a door cutout.

According to the exemplary embodiment according to FIG. 1, the reinforcing structure 1 is part of a side walls structure 100, which is generally formed as an outer side wall structure for a motor vehicle (not shown in FIG. 1). For example, the side wall of a motor vehicle can be designed with such a side wall structure 100 as outer side wall structure and an inner side wall structure (not shown in FIG. 1).

The reinforcing structure 1 is designed ring-like, wherein its inner space surrounded by the ring shape forms a door cutout 110 of the side wall structure 100 so that the reinforcing structure 1 surrounds the door cutout 110.

The reinforcing structure 1 is generally arranged on the inside-facing side of the side wall, generally arranged on the inside on an outer side wall structure, for example, formed thereon.

It is provided that the reinforcing structure 1 is configured unitarily, wherein the reinforcing structure 1 can be produced material-uniformly. The reinforcing structure 1 is produced through hot forming of a semi-finished product and consists of PHS-steel.

The reinforcing structure 1 comprises a plurality of portions 7, 8, 9, 10 with different material thickness. In one example, at least one of the portions 7, 8, 9, 10 is distinct in its material thickness compared to at least one other one of the portions 7, 8, 9, 10.

The portions 7, 8, 9 and 10 are formed differently in order to be able to be connected to different components of the motor vehicle or directly form different components of the motor vehicle.

In the embodiment of the reinforcing structure 1 according to FIG. 1, the portion 7 is at least partially designed in order to be connected to a sill 6 of the vehicle, for example, to a "rocker outer" or form an integral part of the sill 6 at least via one portion. The portion 8 is designed for connecting to the hinge pillar 2 of the motor vehicle or forms at least one portion of the hinge pillar 2 of the motor vehicle or is an integral part of the hinge pillar 2. The portion 9 is designed for connecting to the lateral roof frame 4 of the vehicle and if required for connecting to the A-pillar 3 of the motor vehicle or forms an integral part of the lateral roof frame 4 and if required of the A-pillar 3. The portion 10 in turn is designed for connecting to the B-pillar 5 or forms an integral part of the B-pillar 5.

The semi-finished product is produced from a plurality of sheet metal blanks, which form a ring structure, wherein the reinforcing structure 1 has been formed out of the blanks of the portions 7, 8, 9 and 10.

The blanks used as a base are tailored rolled blanks, which have been butt-welded together in the manner of a tailored welded blank so that on the transition locations 11, 12, 13, 14 of each two blanks or two portions 7, 8 and 8, 9 and 9, 10 and 10, 7 a butt connection is created.

The blanks formed through tailored rolled blanks generally comprise a thickness profile that is not uniform through which on the reinforcing structure 1 a non-uniform thickness profile is likewise established.

Through the present disclosure, a side wall structure for a motor vehicle can be produced, which in terms of weight is very light and yet creates a high degree of reinforcement in the region of a door cutout of the side wall structure. The present disclosure also results in a process optimization with respect to the assembly in the assembly plant. For example, it is possible through the present disclosure that a semi-finished product already formed together into a ring structure is supplied into the plant as a component and the one single component is then formed through forming into the reinforcing ring for the side wall structure.

Altogether, a side wall structure with a ring-shaped reinforcing structure can be produced through the present disclosure, the portions of which can be specifically adapted to a desired reinforcing effect through shaping during the course of the forming method arranged downstream of the semi-finished product as well as through already existing shaping based on a utilized tailored rolled blank. Here it is also possible to specifically set the reinforcing effect to predetermined values through different material thicknesses and thickness profiles of portions of the reinforcing structure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A reinforcing structure for reinforcing a side wall structure for a motor vehicle in the region of a door cutout, the reinforcing structure comprising:
    a ring-shaped structure configured to surround the door cutout of the side wall structure, the ring-shaped structure formed by at least four separate portions that are coupled to each other to define the ring-shape, with at least one of the at least four separate portions having a material thickness that is different than a material thickness of one of the at least four separate portions;
    wherein the reinforcing structure comprises a single component formed by butt-welding the at least four separate portions, with each of the at least four separate portions comprised uniformly of a same, single material; and
    wherein the material comprises a press-hardened steel or a press-hardened steel alloy.

2. The reinforcing structure according to claim 1, wherein the reinforcing structure is at least one of a hot-formed component and a cold-formed component.

3. The reinforcing structure according to claim 1, wherein at least one of the at least four separate portions has a non-uniform thickness profile.

4. A semi-finished product for producing a reinforcing structure that is produced from at least two tailored rolled blanks, the reinforcing structure comprising:
    a ring structure couplable to a sidewall structure of a motor vehicle, the ring structure configured to surround a door cutout formed in the side wall structure;
    wherein the ring structure comprises a single reinforcing component formed by edge to edge welding the at least four separate blanks at a respective transition location, with one of the transition locations defined along a sill of the motor vehicle, two of the transition locations defined along a hinge pillar of the motor vehicle and one of the transition locations defined along a B-pillar of the motor vehicle; and
    wherein the at least four separate blanks comprise a common, single material suitable for press-hardening.

5. A motor vehicle comprising:
    a side wall having a door cutout; and
    a reinforcing structure comprising a ring-shaped structure configured to surround the door cutout of the side wall structure, the reinforcing structure comprising at least four separate portions, wherein at least one of the at least four separate portions comprises a material thickness distinct from at least one other one of the at least four separate portions, wherein the at least four separate portions comprise uniformly a common, single material, and wherein the material comprises a press-hardened steel or a press-hardened steel alloy; and wherein the ring-shaped structure comprises a single reinforcing component formed by butt-welding the at least four separate portions at respective transition locations, with one of the transition locations defined along a sill of the motor vehicle, two of the transition locations defined along a hinge pillar of the motor vehicle and one of the transition locations defined along a B-pillar of the motor vehicle.

6. The motor vehicle of claim 5, wherein the reinforcing structure is on an outer side of the side wall.

7. The motor vehicle of claim 5, wherein the reinforcing structure is on an inner side of the side wall.

8. The motor vehicle of claim 5, wherein at least one of the at least four separate portions has a non-uniform thickness profile.

* * * * *